INVENTOR.
PAUL D. WURZBURGER
BY

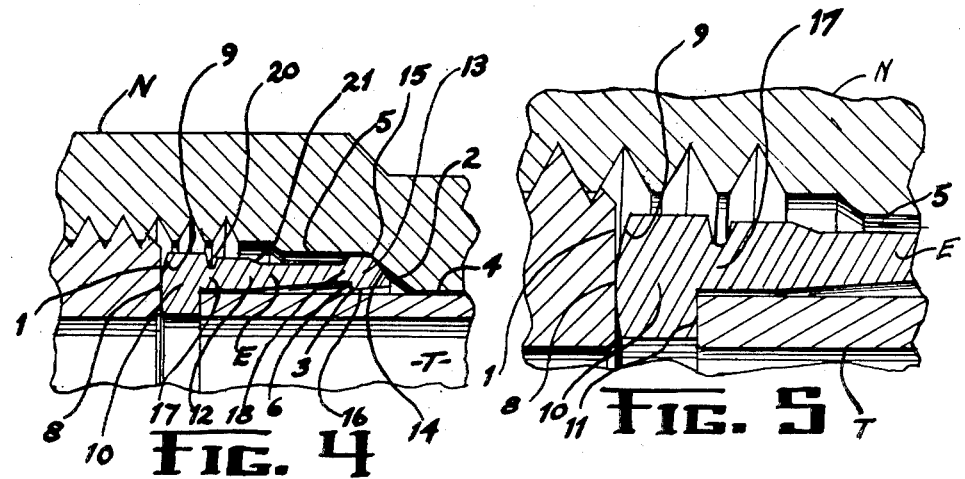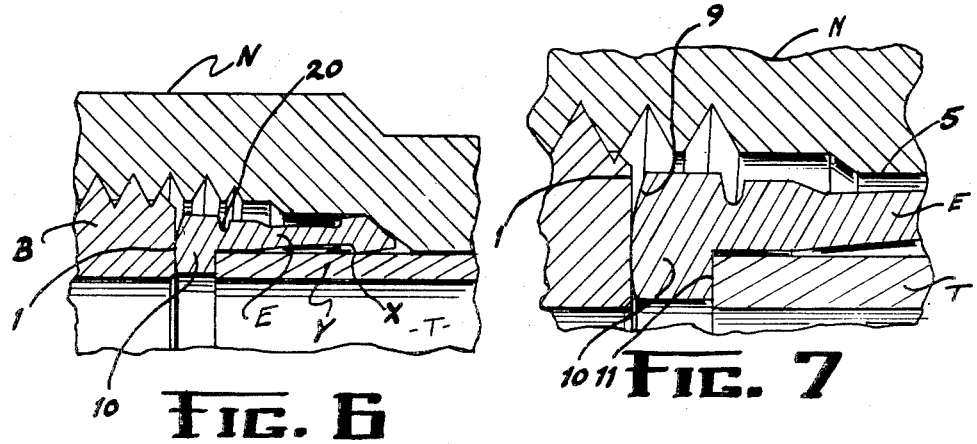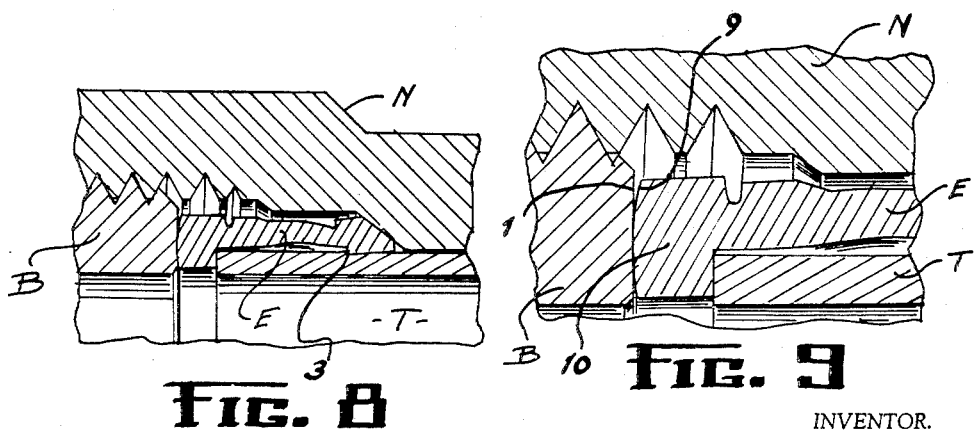

Nov. 5, 1963

P. D. WURZBURGER 3,109,673

COUPLING FOR FLARELESS TUBES

Filed Nov. 21, 1960

INVENTOR.
PAUL D. WURZBURGER
BY

United States Patent Office 3,109,673
Patented Nov. 5, 1963

3,109,673
COUPLING FOR FLARELESS TUBES
Paul D. Wurzburger, 3255 E. Monmouth Road,
Cleveland Heights 18, Ohio
Filed Nov. 21, 1960, Ser. No. 70,781
8 Claims. (Cl. 285—342)

This invention relates to tube couplings of the close and flareless type and more particularly to novel constructions and combinations of, and coactions between, body, nut, tube and coupling element which improve the operation and results of such couplings. In many respects and accomplishments this invention comprises an improvement over my prior U.S. Patent No. 2,693,374, among others.

In the prior art of flareless and threadless couplings wherein an annular cutting edge is forced radially inward and axially forward to cut and gain a strong mechanical grip and fluid-tight seal with the tube-to-be-coupled, the annular structure comprising the edge has been constricted and advanced in relative motion to the tube to be coupled in one or both of two general ways: In one way the edge carrying annulus is advanced and jammed into the flared mouth of the coupling body and there constricted and advanced. In the other way, as in my prior patent, the edge carrying annulus is worked with and under the camming shoulder of the coupling nut against yielding resistance of means interposed between the flush rear end of the body and the edge carrying annulus. In this way and in the familiar terms of this art the tube cutting edge has been carried by the so-called ring portion at the rear end of a flexible and buckleable sleeve portion of the coupling element by the yielding of which, when forcibly worked between the coupling nut and the body, useful plowing motion and cutting action of the edge relative to and into the tube is affected. The latter type of coupling has the marked advantage, among others, of affordng "closeness" and non-overlapping of parts in respect to the end of the body whereby no longitudinal motion of the tube and/or coupling element relative to the body is required for attachment therewith or detachment therefrom.

In these close couplings of the type of my prior patent it is often difficult and/or expensive to provide desirable hardness in, or case-hardening of, the cutting edge of the ring part without getting an undesirable brittleness of, and/or tendency toward fracture in, the yielding, buckleable part of the sleeve or bridge part of the coupling element. If the latter is protected from hardening while the edge is being hardened, the matter becomes costly and not without risk that the protection will be insufficient and/or the best balance between the stiffness and flexibility thereof will be impaired if not lost. In such couplings much flexing of the bridge or sleeve is indigenous; a thing which of itself may risk fracture or failure and/or diminish the residual spring that aids in satisfactory repeated recouplings.

Where great flexing of the sleeve or bridge is requisite to gain, or unavoidable in getting, a desired cutting motion and result from the cutting edge, collateral risks present themselves in (1) the loss of axial resistance to motion of the ring, and (2) insufficient radial resistance to or toward collapsing, or deleteriously constricting, the tube. Particularly when my prior bridge is buckled inwardly with much flexing, control over the motion and desired limits of motion of the cutting edge tends to be lost, or gravely diminished, with the risk that soft, thin-walled tubes, at one extreme, may tend to be overcut and/or unduly constricted while at the other extreme as with hard, thick-walled tubing, a bridge given to great flexing may tend to afford less than sufficient axial resistance to develop a most desirable or even acceptable minimum, radial component for properly cutting the tube.

It is a general object of my present invention to improve upon my prior practices and others of the prior art and solve such problems as those discussed above. It is an object of my invention to provide a close tube coupling of the general type of my prior patent in which desirable and advantageous motions of, and control of the motions of, a cutting edge in respect to the tube may be had without deleterious or undesirable flexing, bending or working of the coupling element. Another object of my invention is to provide a close tube coupling in which the coupling element comprising the cutting edge may have the cutting edge part thereof hardened or case-hardened to a desirable and efficient state of hardness without the cost or trouble of preserving other parts of the coupling element from similar or incidential hardening, and without impairing, or for that matter improving, the advantageous functioning and/or working of such other part or parts of the coupling element, as well as its coaction with the other parts of the coupling and the tube.

Another object of my invention is to provide a close tube coupling with a deformable and/or workable coupling element by the working of which the tube is cut and gripped, in which the flexing of the coupling element will be less than prior practice but in a different way wherewith to preserve the tube from deleterious constricting and/or collapsing forces while gripping and sealing the tube advantageously. Another object of my invention is to provide a tube coupling having a coupling element that yieldably admits axial cutting motion of the cutting edge by the working thereof other than by the mere buckling, bulging or bending of the element. Another object is to provide a new coaction between the nut of a tube coupling and the deformable coupling element thereof wherewith to limit the deleterious deformation while facilitating repeated uncoupling and recoupling.

Another object of my invention is to provide a better fluid seal between the coupling element and the end wall of the body of the coupling and also to gain a more advantageous coaction between this sealing action and the other simultaneous actions and functions of the coupling element. Yet another object is to gain a new and better coaction and result between the coupling element, body, nut and tube.

A more specific object is to provide a close or non-overlapping type sleeve and body joint wherein the required amount of forward tube cutting and gripping motion of the edge is had from controlled combinations of outward bowing and cold flowing of the sleeve wall, avoiding, inter alia, destructive stress concentrations, when the coupling element is worked between the body of the coupling and the camming shoulder of the nut. Another object is to provide a tube coupling with sufficient residual resiliency to prevent loosening under severe vibration, creep and/or widely varying temperature conditions. A further object is to provide a non-overlapping type tube coupling joint which may be connected and disconnected repeatedly with uniformly satisfactory results.

These and other objects and advantages of my invention will appear from the following description of preferred and modified forms thereof, reference being made to the accompanying drawings in which:

FIGURE 4 is an enlarged fragmentary section of the parts as related and shown in FIG. 2.

FIGURE 5 is a further enlargement of a portion of FIG. 4 including only the forward part of the sleeve contacting the rearward end of the body along with other proximate portions of the nut and tube.

FIGURE 6 is a view corresponding to FIG. 4 showing the parts of the coupling in an early worked condition with the ring of the sleeve constricted into first engagement with the tube.

FIGURE 7 is a further enlargement of part of FIG. 6 related thereto as FIG. 5 is to FIG 4.

FIGURES 8 and 9 are views corresponding respectively to FIGS. 4 and 5 with, however, the parts worked about mid-way to a fully coupled engagement.

Figure 10:
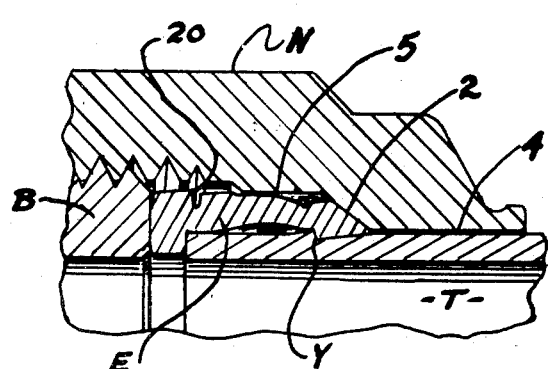
FIGURES 10 and 11 are views corresponding respectively to FIGS. 4 and 5 with, however, the parts worked to about a first useful and/or desirable complete assembly and fully coupled engagement.
Figure 11:
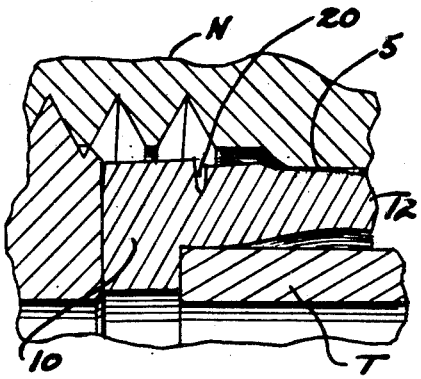
Figure 12:
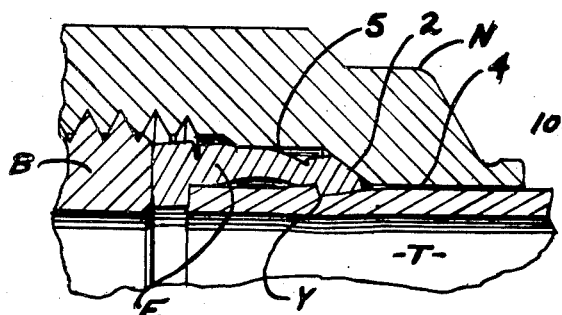
Figure 13:
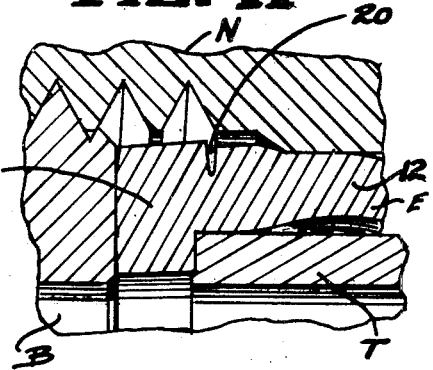

FIGURES 12 and 13 are also views corresponding respectively to FIGS. 4 and 5 with, however, the parts worked to a substantially ultimate state, i.e. to a somewhat greater degree than shown in FIGS. 10 and 11.

Figure 14:
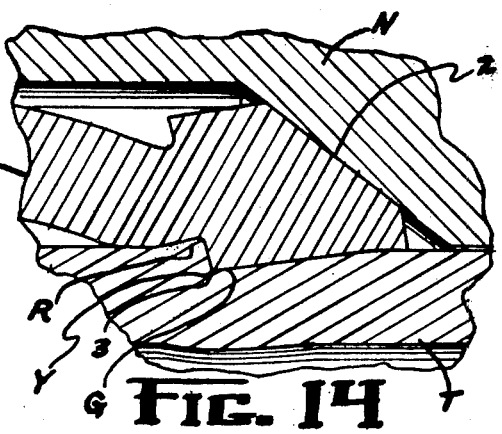

FIGURE 14 is a further enlargement of a portion of the sectional views of FIGS. 10 and 12 showing the rearward, i.e. ring, portion of the coupling sleeve worked under the camming shoulder of the nut to have brought the cutting edge into full gripping and sealing engagement with the tube.

Figure 3:
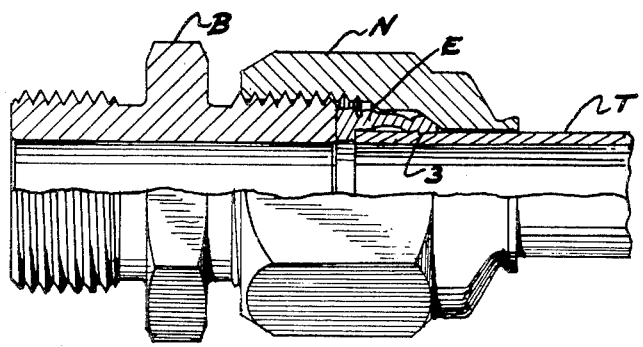
FIGURE 3 is a view similar to FIG. 2 showing, however, the several parts fully coupled together and the sleeve worked between the nut and body and gripping the tube.
Figure 15:
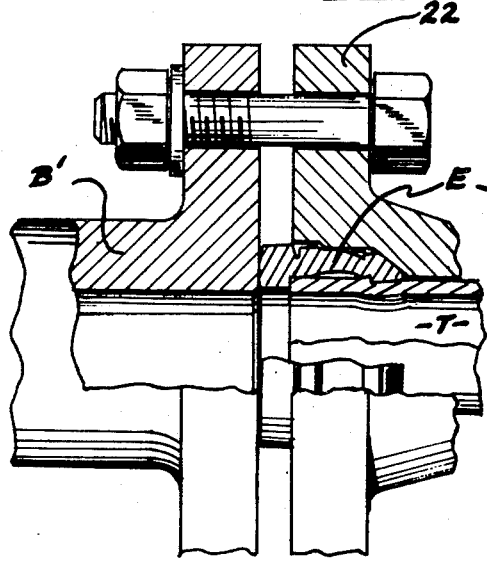

FIGURE 15 is a side elevation, partly in section, showing my invention in the environment of a flanged joint with the parts worked to about the condition shown in FIGS. 3, 10 and/or 12.

Figure 1:
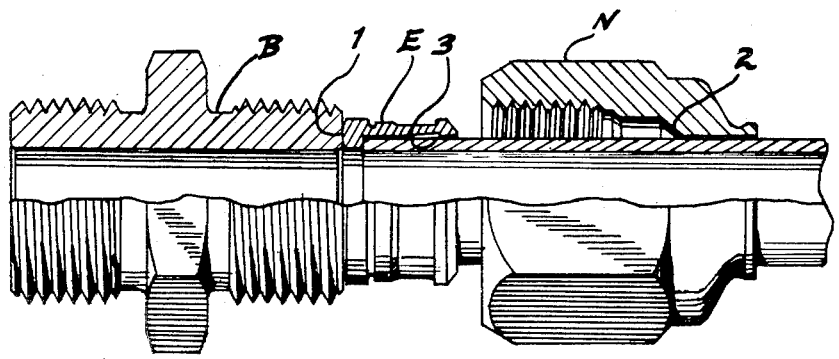
FIGURE 1 is a side elevation partly in longitudinal section of the tube and coupling parts in pre-assembled and aligned relation.
Figure 2:
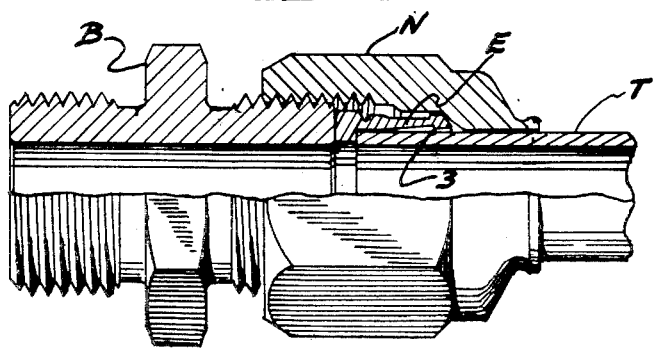
FIGURE 2 is a view similar to FIG. 1, showing the nut and body in threaded engagement, and in initial contact with the coupling element or sleeve.
Figure 16:
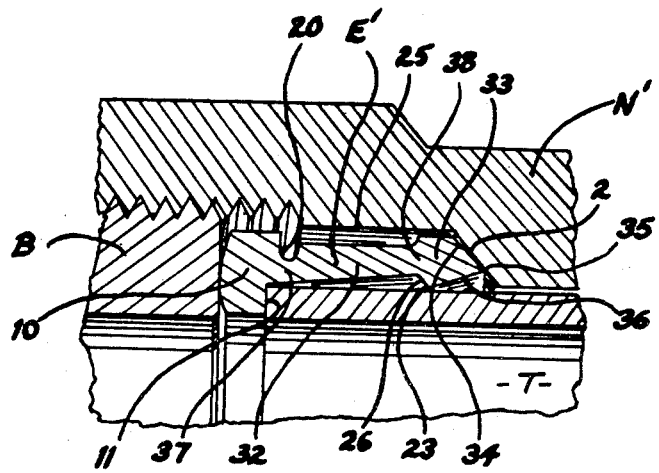

FIGURE 16 is an enlarged fragmentary, longitudinal sectional view of a modified form of my invention with the parts of the coupling and the tube in a state of initial assembly and mutual contact corresponding approximately to the state of the preferred form of my invention shown in FIGS. 2, 4 and 5.

Figure 17:
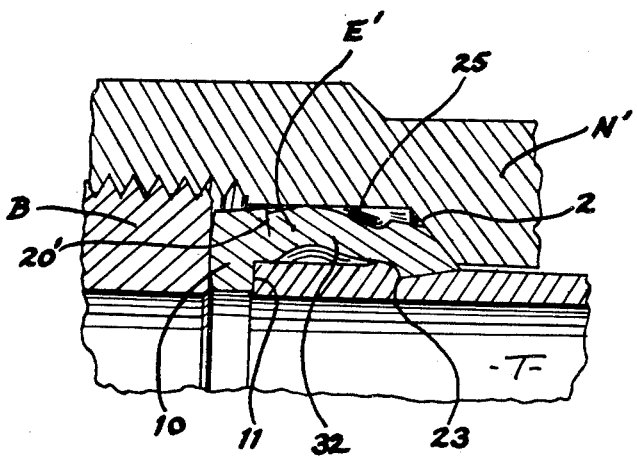

FIGURE 17 is a view similar to that of FIG. 16 showing the same modified form of my invention with, however, the coupling parts in full, worked and coupled engagement with each other and with the tube, corresponding approximately to the conditions of the preferred form of my invention shown in FIGS. 3 and 10 to 14 inclusive.

In the preferred form of my invention with the illustrative threaded nut and body as shown in FIGURES 1–14 inclusive, the body B, to the rearward end of which the tube T is sought to be, and is, coupled, has external threads coacting with the internal threads of the nut N by virtue of which the coupling element or sleeve E is worked between the rearward flush end face 1 of the body and the forwardly facing internal, preferably conical, camming shoulder 2 of the nut, progressively FIGS. 1 to 3 and FIGS. 4 to 14, into fluid tight and mechanically stout engagement with the tube T. An essential incident and result of this working of the sleeve E is the inward radial constriction of the annular cutting edge 3 and its simultaneous forward plowing motion into the outer wall of the tube T, cf. FIGS. 2 and 4 with FIGS. 3 and 14, as from about the point, i.e. circle, X to the point, circle, Y, FIGS. 6, 10 and 12, while cutting the annular groove G in the wall of the tube and turning up the annular ridge R of appreciable size in front of the cutting edge as shown with maximum enlargement in FIG. 14. The predetermination and control of the motion, action and effect of the cutting edge by the mutual coaction of the body, nut and sleeve in their combined functions and operations is a major concern and accomplishment of my present invention.

The nut N has a cylindrical bore 4 opening rearwardly from the inner rearward end of the camming shoulder 2; the bore freely clearing the O.D. of the tube and permitting freedom of motion between the nut and the tube. The nut also has a cylindrical or forwardly opening, slightly conical, counterbore 5 extending forwardly from the outer and forward end of the camming shoulder substantially to the rearward end of the female threads of the nut; the counterbore having a diameter no less than the desired maximum worked and bulged diameter of the coupling sleeve E, FIGS. 10–13, and see also FIG. 17. The diameter of the counterbore is, however, less than, preferably only a little less than, the minimum internal diameter of the threads so that diametric expansion of the sleeve E is constrained by engagement with the counterbore, FIGS. 3, 10, 12, 15 and 16, to a lesser diameter than the threads to permit the free removal of the nut rearwardly over and away from the worked sleeve with free clearance between the threads and the greatest bulged diameter of the sleeve.

Turning now more particularly to the enlarged fragmentary views of FIGS. 4 and 5, it will more fully appear that the sleeve or coupling element E in its preferred form comprises at its forward end a stout annular abutment part 10 having a radial thickness two or three times the wall thickness of the tube T with its inner diameter similar to but not less than the I.D. of the tube and its outer diameter no more than the minimum diameter of the threads of the body whereby to clear the threads of the nut as shown. The abutment has an axial thickness nearly half its radial dimension and has a significantly rounded torus-shaped forward face 9 having an initial circular line contact at about 8 with the flush rear face 1 of the body in about the extension of the geometric cylinder of the O.D. of the tube, about as shown in the drawings, FIGS. 4 and 5, and also in the modified form in FIG. 16. The inner rearward side of the abutment 10 receives the extreme forward end of the tube T in the rearwardly facing recess 11.

Integrally formed with and extending rearwardly from the abutment part 10 of the sleeve E is the hollow column part 12, with its annular wall tapering in thickness from the abutment rearwardly where it is integrally joined with the annular ring part 13. The office and function of the column 12, and its coaction with the other parts of the sleeve and other parts of the coupling has much to do with the operation of my invention as will more fully appear below.

The ring part 13 comprises at its inner and forward corner the annular cutting edge 3 formed at and by the sharp, approximately right angled intersection of the inner forward radial face 6 of the ring with the inner forward end of the bore 16 of the ring; the edge comprising the literal circle of intersection and the adjacent surfaces of the face and bore, all harder than, or hardened to be harder than, the tube to be cut by the edge. I prefer that the bore 16 have a modest initial taper and that the edge 3 have an initial diameter just affording free clearance with the tube of greatest diameter of its normal size within normal manufacturing tolerances. When the joint is made, the cutting edge is moved forcibly radially inwardly and longitudinally forwardly, as from X to Y suggested above. The rearward and outward side of the ring 13 is beveled at from about 45° to 55° to truncated conical form, presenting a smooth, substantially conical surface 14 comprising a male camming shoulder which is progressively engaged by the coact female conical camming shoulder 2 in the nut N. The pitch of the shoulder 2 in reference to the axis of the coupling is preferably from about 5° to 15° less than the pitch of the surface 14 so that initial working contact between these surfaces, FIG. 4, is made at and near the outermost rearward corner of the ring 13, as at 15, whereby the force transmitted to the coupling element E from the nut N is first applied at and near the point 15, and is resolved inwardly and forwardly tending to constrict the ring and tip it a little counterclockwise, as viewed in FIGS. 4 and 6, as from about the position of the former to the latter while the cutting edge 3 is first being constricted and moved into contact with the tube and addressed to its cutting, plowing and gripping business therewith. Initial counterclockwise rotation of the ring will bring a little desirable negative rake to the front radial face 6 of the cutting edge and will increase the clearance behind the edge by tending to increase the taper of the bore 16 of the ring rearwardly adjacent the edge, and will oppose bulging of the column 12.

The column 12 may be thought of functionally as having its base 17 integrated with the abutment 10 at its forward end, and its head, i.e. rearward end, 18 joined to the ring 13. The inner cylindrical face of the base of the column comprises part of the recess 11 which receives the extreme forward end of the tube with a free to no less than a close sliding fit having regard for variations in commercial tube sizes on the one hand and the advantage of centering the tube in the coupling through a proper fit within the recess, and thus within the sleeve E, on the other hand. Between the base of the column 12 and the outer margin of the front face 6 of the cutting edge the inner face of the column takes conical form tapering smoothly outwardly from front to rear and correspondingly reducing the wall thickness of the column. The radial depth of the face 6 of the ring measures the taper of the inner face of the column. The radial depth of the face 6 is preferably chosen to gauge the desired sum of the depth of the groove G in the tube plus the height of the ridge R which is turned up therefrom and squeezed against the tube wall in front of the groove, FIG. 14, following the teaching in this respect of my prior patent. The inner tapered face of the column and the front face 6 of the cutting edge join in a smooth fillet as shown in FIG. 14.

Externally of the base 17 of the column 12 there is provided an annular external groove 20 having a gross width and depth, each, of from about ¼ to ½ the thickness of the base of the column and having a rounded bottom and smoothly flaring side walls, see FIG. 5. The base of the column is weakened by the groove 20 to, firstly, facilitate the initial inward radial constriction of the ring 13 with a slight opening of, or tendency to open, the groove. Then as columnar loading is developed, the groove facilitates outward bending of the base of the column near the root of the groove with pinching of the groove toward or to a tight-shut condition, see and cf. FIGS. 13 and 17, the groove locating the place of greater bending. The groove also establishes a place of diminished cross sectional area at the base of the column where axial foreshortening, radial thickening and cold-flowing is encouraged and concentrated during the working of the sleeve, cf. FIGS. 4 and 11. The groove 20 also serves to limit these functions and these virtues of weakness as it approaches and/or reaches a closed condition, FIGS. 11, 13 and 17, whereupon a new, useful and different strength and final resistance to excessive or deleterious bulging is bestowed upon the worked column. The interrelation of the width and depth and degree of flaring of the groove 20 and the relation of the size of the groove to the size of the base of the column modifies the mode of operation and results suggested above, regard being had, subjectively, for the material from which the sleeve is made and, objectively, for the material of the tube. The width and flare of a groove having a given depth tends to be a limiting factor, see FIG. 13, to both the bending and foreshortening of the base of the column. For example, in the modified form of my invention as shown in FIG. 17, I contemplate that the groove will be substantially closed after the sleeve has been worked to first make a joint so that the bent and foreshortened base will gain, rather abruptly, a new and augmented resistance to both bending and further foreshortening. The same will tend to follow, except perhaps in degree, with the sleeve of my preferred form. When the latter has been worked to the conditions suggested in FIGS. 11 or 13 the part of the base near the groove will have been thickened and shortened under axial load and much increased in resistance to further bending and further foreshortening.

The selection of materials for making the sleeve E may advantageously follow the teaching of my prior patent. The size of the groove 20 will tend to be about the same with respect to the different materials from which the sleeves are made so long as the softer, or harder, materials are employed with correspondingly softer, or harder, tubes, respectively, other things being equal. However, the size of the groove 20 may be advantageously modified to be related to the wall thickness of tubes of equally soft, or hard, material. For example, when soft thin walled tubes are to be coupled, the groove G, in a sleeve of given material may advantageously be made bigger to weaken the base of the column more fully than would be the case with a thick walled tube of the same material. With a thick walled tube, other things being equal, a relatively smaller groove G will retain greater strength in the base of the column which will compel greater torque on the nut and compel greater radial constriction of the cutting edge per increment of forward motion thereof, whereby to bite the tube more firmly and deeply and to exert greater radial forces thereupon than would be most desirable to couple thin walled tubing. For like reasons, sleeves E which have grooves 20 of the same size and shape but are made of different materials will reflect the different strength of the different materials in their different resistances to deformation under working conditions; the stronger material naturally resisting deformation more fully than the weaker. Moreover, the column 12 in its length from the base thereof to the ring, requires stout resistance to axial motion of the cutting edge and of the ring to develop the initial radial components of force sufficient to induce radial biting of the cutting edge into the wall of the tube. Such resistance to axial motion of the edge must, however, to gain the best advantages of my invention, be tempered so as to yield and permit axial motion of the edge commensurate with the radial motion to gain the desired plowing effect of moving the edge from about X to Y as mentioned above.

As suggested in FIGS. 10 and 11, my preference is that the column 12 and particularly the base 17 thereof have such yielding strength that a first working of the sleeve E to make a first satisfactory joint between the tube and body will bulge out the column to approximately the extent shown, just at or short of contact with the counterbore 5 of the nut. This, as shown, will pinch the groove 20 down to less than half its original width and leave a reserve for more bending and pinching for repeated couplings, FIGS. 12 and 13. My teaching as to this preferred form of my invention, therefore, is consistent with the other functions, values and factors herein discussed, to make the groove 20 deep and wide enough to aid the bending and foreshortening of the column so that the outward bulging will not quite contact the counterbore 5 of the nut when the sleeve has been fully worked and the first full cut from X to Y has been made and a full, satisfactory joint between the tube and the body has been accomplished the first time.

The groove 20 may also denote an inward step in the external diameter of the sleeve wherewith the external diameter of the column 12 rearwardly of the groove is preferably smaller than the external diameter of the abutment 10, albeit I prefer to have the wall thickness of the column 12 adjacent the groove and rearwardly thereof nearly twice as thick as the thinnest part of the column wall adjacent the ring 13 wherewith to induce the bulging of the wall of the column to take place more nearly the ring than the abutment and to tend to invite the maximum bulging to take place within the counterbore 5 of the nut when the sleeve is being worked to its greatest bulged condition as suggested for example in FIGS. 12, 13 and, modified form, FIG. 17.

In the preferred form of my invention the external surface of the column may comprise the cylindrical portion adjacent the base 17 of the column and another portion of smaller diameter joined by a smoothly tapered portion 21 with a smooth gradual reduction in wall thickness from the base 17 of the column to the head 18 thereof. The external diameter of the head 18 of the column is preferably markedly smaller than the external diameter of the ring 13 and joined thereto with a smoothly rounded fillet. The tapered surface 21 of the column makes a smooth gradual junction with the adjacent greater and smaller cylindrical surfaces whereby to avoid points or zones of undue stress concentration which might otherwise tend to invite deleterious fractures when the sleeve E and especially the column 12 thereof is being worked to give the cutting edge its desired motion and function.

The relative sizes of the different parts of the coupling sleeve E and the coacting parts of the nut, body and tube in this preferred form of my invention are fairly represented in the drawings, according to my best present information, tests and practice, and may be summarized or supplemented for rule of thumb and the practicable enjoyment of my invention thus: The radial wall thickness of the head 18 of the column 12 of the sleeve E may be about the same or a little smaller than the unworked, radial, virgin thickness of the base 17 at the root of the groove 20. The wall thickness just rearwardly of the groove is from 50% greater to nearly twice as great as the wall thickness at the head. The length of the column 12 from the abutment 10 to the ring 13 is several times the minimum wall thickness of the column at the head and is preferably from about 6 to 8 times that wall thickness. In these and in the other proportional relationships hereinabove described, the outward bulging of the column after the same has been fully worked, see FIGS. 10 to 13, inclusive, will comprise about 3% to 5% increase in diameter where the bulging is greatest, and not exceed the diameter of the counterbore 5; the short, thick portion of the column adjacent the groove bulging relatively little while bending to a greater diameter than the counterbore in this form of my invention, see FIG. 13.

The substantial bulging of the column wherein the flexing is greatest, as shown in FIGS. 10 and 12, is preferably a little less, as measured on its outside diameter, than the minimum thickness in the head of the column; it also being my preference that the radial dimension of the space between the outside diameter of the tube and the inside diameter of the counterbore be equal to only a little more than twice the wall thickness of the column at the head 18 thereof, given the front face 6 of the cutting edge proportioned about as shown.

The distance that the cutting edge is moved to make a full coupled joint from the point X, FIG. 6, to the point Y, FIGS. 6, 10 and 12 in this illustrative form of my invention, is approximately one-fifth of the length of the column, i.e. about the same as the wall thickness of the head of the column. An advantage of my invention is that I have provided a great cutting and plowing motion to the cutting edge with a novel, modest and safe flexing and bulging of the column part of the coupling sleeve. One means of this accomplishment is the foreshortening and thickening of the column and especially the base portion thereof adjacent the groove where cold flowing and thickening is invited and controlled by the presence of the groove, the ease of initial bending adjacent the root thereof and the relative resistance of the column to excessive bulging.

The limited, desirable bulging of the column, and its resistance to over-flexing, is fostered by the thickness of its walls and by the taper thereof from the quite thick, relative inflexible forward portions to the more yielding rearward portions. This desired restraint of bulging is also aided by surface hardening of the outer skin of, preferably, the whole coupling sleeve, particularly the column, along with the cutting edge. Such surface hardening may comprise familiar case hardening of steel sleeves, the more recent chemical surface hardening of aluminum sleeves, and familiar work hardening by machining the exteriors of all metallic sleeves. Surface or skin hardening stiffens the structure against beam or column bending without, however, substantially impairing the tendency of the relatively soft interior stock to cold-flow. Surface hardening offers little impairment of the wall of the column and sleeve to thicken and/or foreshorten under columnar loading during the working thereof in my coupling. Moreover, this thickening, including the part of the base under the root of the groove, progressively adds resistance to excessive bulging and tends to preserve the parts against deleterious overflexing and fracture.

While the coupling sleeve E is being worked as from FIG. 4 to FIG. 14 and the cutting edge is being forced from X to Y, axial thrust is transmitted to the abutment (and opposed at the rear end of the body) through the column and through the end of the tube ahead of the cutting edge. At first, little axial thrust is transmitted to the abutment through the end of the tube, and most of it is transmitted to the abutment through the column. This tends to roll the abutment counterclockwise, as viewed in the drawings, and tilt the base of the column 12 outwardly in the direction consistent with the bulging of the column and in initial aid thereof. As the bite of the cutting edge goes deeper into the tube, an increasing part of the axial thrust goes through the end of the tube to the abutment, tending to tilt the abutment clockwise so that the resultant forces on the abutment increasingly oppose further bulging of the column 12. This influence also favors the desirable minimum bulging consistent with the full plowing of the tube and the full grip and seal between the nut, the sleeve, the tube and the body.

Meanwhile, as suggested in the drawings, cf. FIG. 5 with FIGS. 11 and 13, the hard, torus-shaped forward face of the abutment will have pressed into the flush end of the body and will have been progressively flattened from its initial, high-unit-pressure, line contact to an annular area of fluid-tight bond and forcible engagement. And, see FIGS. 5, 7, 9, 11 and 13 incl., the working of the abutment and the control of the bulging of the column is accompanied by the intended thickening of the column at the root of the groove 20 with the radial constriction of the cylindrical face of the recess 11. As the working draws to completion with the final establishment of the desired joint, an increasingly tight fit is obtained between both the radial and cylindrical surfaces of the extreme end of the tube with the abutment 10 and the base of the column throughout the recess 11 with desirable consequences not only in relation to the mechanical grip and fluid seal between the tube and the coupling sleeve, but also with marked resistance of the coupled joint to failure under adverse conditions of mechanical and hydraulic vibration as well as of mechanical and thermal stress and shock. The stressed bent state of the abutment tends to regain thte torus bulge on its front face, and the stressed compressed states of the column and the end of the tube thereagainst, combine to give the coupling resilience in its mutual intramural engagements as against adverse working burdens and loads, and also help the uncoupling of the parts and the recoupling of the joint. I believe this is probably due to the facility with which these stressed parts may expand, contract and flex in their stressed states without losing the helpful, underlying, minimum stresses and pressures sufficient to preserve fluid-tight engagement and mechanical grip safe from the adverse burdens to which the coupling may be exposed.

As heretofore suggested about this preferred form of my invention, a satisfactory coupled joint may be made the first time by and upon working the constituent parts of the coupling from the condition of initial engagement shown in FIGS. 4 and 5 to the fully worked condition shown in FIGS. 10 and 11 wherein it is intended to be suggested that the column 12 of the sleeve E will not, or will not necessarily, have been bulged outwardly into contact with the counterbore 5 of the nut, but will have been restrained by the factors and conditions which limit or become satisfied with less than the maximum bulging permitted by the counterbore. It is among the advantages of my invention that the parts may be uncoupled and repeatedly recoupled or reset many times with facility and with preservation of pristine advantage and utility. After a plurality of, perhaps a half dozen, recouplings or resettings of my coupling combination, I have observed that the bulging of the column increases and tends to have a resilient bottoming against the counterbore as shown in FIGS. 12 and 13 from which, however, it tends to "spring back" and gain useful clearance when the nut is backed off for a subsequent uncoupling. After repeated resets the abutment tends to gain an increasingly wide bearing upon and engagement with the rear face of the body, cf. FIGS. 11 and 13, and the general thickening of the column may also tend to be increased slightly. Whether or not the bulging of the column is literally restrained by the counterbore of the nut, or as suggested in FIGS. 10 and 11, the bulging is restrained just short thereof by the workings and reactions mentioned above, the overall flexing of the column is always kept safely small and, moreover, the condition of maximum bulging, or maximum desirable bulging, is desirably signalled to the operator by a noticeable increase in wrench torque when the first coupling or recoupling work is done.

At all times after the first full working of the sleeve E in respect to the tube and the cutting of the groove G therein, FIG. 14, the sleeve E will be substantially integrated with the end of the tube with the exception that when the nut is backed off from the body and the external forces are removed from the ring and the abutment, the "spring back" of the parts will tend to partially relieve the stressed grip between the coupling element and the end of the tube. This relief is so modest, however, that in practice I have found that the nut need be forcibly tightened only as little as about one-sixth of a turn from engagement at hand-tightness to a complete tight recoupled joint. I say one-sixth of a turn, having in mind threads of a coarseness related to the size of the parts substantially as shown in the drawings wherein about one full turn of the nut on the threads of the body after the parts are first hand tightened, as shown in FIGS. 4 and 5, will work the parts to effect the fully coupled joint, as shown in FIGS. 10 and 11. As a practical matter, one full turn will generally serve for coupling one inch tubing of thin or medium wall thickness while a little less than a full turn will suffice for smaller tube sizes and a little more than a full turn will serve for larger tube sizes. For the coupling of heavy wall tubing, more working of the sleeve E and deeper plowing of the cutting edge is desirable, and will be accomplished with about one-sixth more turning of the nut on the threads of the body than prescribed for thin and medium wall tubing.

To further illustrate the practicalities as well as the sizes and proportions of the parts, a few illustrative dimensions taken from commercial embodiments are mentioned thus: In a coupling for a ½" O.D. tube, the internal diameter of the abutment 10 of the sleeve E may be .436", the outside diameter of the abutment and the initial outside diameter of the ring is .646", the inside diameter of the recess 11 is .505", the overall length of the sleeve E is .449", the inside diameter of the bore 4 of the nut is .505", the overall length of the nut is 1.030" and the threads of the nut and body are straight unified ¾" diameter threads at 16 turns per inch. In a coupling for a 1" O.D. tube similar characteristic dimensions which I have found practicable are these: The inside diameter of the abutment is .876", the outside diameter of the abutment and the outside diameter of the ring is 1.157", the inside diameter of the recess 11 is 1.006" and the overall length of the sleeve is .528"; the bore of the nut being 1.006", the length of the nut 1.430" and the threads of the nut and body being straight unified 1$\frac{5}{16}$" diameter with twelve turns per inch.

In FIG. 15 the preferred form of my invention is adapted to a flange joint and does the same work in the same combination in the same way and gets the same result; the free flange 22 being related to the tube T and sleeve E as the nut N is related to corresponding parts, and the flanged body B' coacting with the flange 22 and sleeve E as the nut N of the body B does with corresponding parts. Throughout my descriptions and claims I have and shall employ the words "nut" and "body" to comprehend the literal nut and body of FIGS. 1 to 13 and also all equivalent instrumentalities including, among others, the flange 22 and flanged body B' of FIG. 15.

In FIGS. 16 and 17 I have illustrated a modified form and embodiment of my invention. Generally, like parts will bear the same reference characters and all parts corresponding to those in my preferred form should be taken as similar and equivalent except wherein the differences in structure and mode of operation are noted and described. Here the body B may be the same as the body of my preferred form. The nut N' in this modified form may correspond entirely to the nut N of the preferred form excepting that the counterbore 25 be straight and continuous but otherwise the same and of the same diameter as the preferred form. The nut N' has the same threaded engagement with the body B and has the same female conical camming shoulder 2 as in my preferred form, pitched at about the same angle (40°±10°). In this modified form of my invention the male conical camming shoulder 34 of the ring 33 of the coupling sleeve E' is pitched about the same as the female shoulder of the nut or, as shown, about 5° to 10° less whereby to induce no counterlockwise rolling of the ring 33 (as distinguished from the preferred form) or to induce an initial clockwise rolling of the ring when, as suggested in FIG. 16, the camming shoulders first make contact at the lowermost and rearmost corner 35 of the ring. That is to say, in this modified form of my invention the ring will be rolled in the same way that the column of the coupling element is bulged outwardly, or should the camming shoulders be congruent, there will be no rolling of the ring opposed to the bulging, flexing motion of the column.

In this form of my invention the coupling element or sleeve E' may correspond entirely to the coupling element E with the exception of the pitch of the camming shoulder of the ring mentioned above, and with the other specific exceptions and differences mentioned below. The coupling element E' has the same abutment 10 as in the preferred form coacting with the body forwardly and the tube T inwardly and rearwardly in the recess 11 in the same way as in the preferred form. The coupling element E' also comprises a column portion 32 joining the abutment 10 with the ring 33 in much the same way and with substantial structure and functional resemblance to the column 12 of the sleeve E. The groove 20 is embodied in the sleeve E' in substantially the same relation to the column and the abutment and with similar purpose and effect as in the preferred form.

The coupling element E' differs from the coupling element E of the preferred form in modest structural ways: The bore 36 of the ring is of steeper conical form and pitch than the bore 13 of the ring 12 wherewith to afford adequate clearance behind the cutting edge 23 when the ring is rolled a little in the clockwise direction tending to reduce the initial clearance between the edge and the wall of the tube. Similarly, the forward face 26 of the cutting edge 23 is raked a little more forwardly from the radial plane of the edge than in the preferred form so that the edge will have a desirable slight negative rake during its plowing motion. Withall, the edge 23 will comprise an approximately right angled edge like the preferred form. The inner face of the column 32 may be tapered from the forward base 37 of the column near the abutment to the head 38 of the column near the ring, and the inner tapered face merges smoothly with the forward face 26 of the cutting edge. Externally the column may have a smooth, straight cylindrical surface between the groove 20 and the ring 33 and smaller in diameter than the O.D. of the ring and abutment. The column will taper smoothly and gradually from its base 37 to its head 38 much as in the preferred form. The wall thickness of the column at the root of the groove 20 may substantially correspond to or be slightly less than the thickness of the wall near the head 38. Otherwise, the proportions of the parts of the column 32 and of the whole of the element E', along with the choice of materials from which the same shall be made, may follow the teaching of the preferred form of my invention.

The mode of operation of this modified form of my invention is also generally similar to the mode of operation of my preferred form excepting that here in the modified form as mentioned above, the ring is rotated consistently, or not inconsistently, with the bulge of the column 32 under the columnar load imposed upon it when the element is forcibly worked between the nut and the body. In this form of my invention, therefore, the bulging of the column 32 is aided, and/or not opposed, by the motion of the ring and is initiated at a somewhat earlier stage of the working of the element E'. In this form of my invention, I contemplate that the column will in the first working, and will in all subsequent recouplings, be bulged outwardly into substantial contact with the bore 25 of the nut and will tend to close and pinch the groove 20 substantially shut as suggested at 20' in FIG. 17, not later than the completion of the desired plowing action of the edge 23 and with the desired working relationship between the abutment 10 and the rear end of the body, cf. FIGS. 16 and 17.

In this form of my invention the "bottoming" of the bulged column in the counterbore of the nut and the pinching shut of the groove 20 and the substantial flattening of the abutment against the body will be, or will have been, accompanied by a foreshortening and thickening of the column wall as in the preferred form. Here the bulging of the column will follow a more simple curve than the slightly compound curve of the preferred form. This "bottoming" will tend to signal more noticeably the completion of the joint by a sharper increase in wrench torque when the joint is completely formed as suggested in FIG. 17. As in the preferred form of my invention, the same relatively great plowing motion of the cutting edge is afforded with such modest flexing of the coupling element as to preserve it safe against fracture or deleterious stress even though it be skin-hardened throughout as an incident to hardening the cutting edge. As in the preferred form of my invention this modified form will facilitate many uncouplings and recouplings with continued utility and advantage.

While I have illustrated and described preferred and modified forms of my invention, changes, modifications and improvements will occur to those skilled in the art who come to understand and enjoy the practice thereof and the teaching of the specification. Therefore, I do not care to be limited in the scope of my patent to the literal forms and examples of my invention herein specifically illustrated and described, nor limited in any way inconsistent with the progress of the art which has been promoted by my invention.

I claim:

1. A worked and joined tube coupling comprising in combination,
   a body to the rearward end of which a tube is coupled,
   a nut coacting with said body and having a forwardly facing camming shoulder and having an annular chamber forwardly of said camming shoulder,
   a coupling sleeve surrounding the tube and worked in said chamber between the shoulder of the nut and the end of the body to reduced axial length and into stressed engagement with the body, the nut and the tube, wherein said sleeve comprises
      a substantially unmoved abutment at its forward end in forcible engagement with the end of said body, a worked hollow column in the middle of the sleeve, the wall of which tapers from greater wall thickness at its forward end to lesser wall thickness at its rearward end and has been bulged outwardly in said chamber and moved bodily forwardly relative to said abutment,
      an integral annular column base connecting the column and abutment, which base was originally smaller and weaker than the adjacent thick walled end of said column and has been worked to reduce length and compressed between said abutment and column,
      an annular groove radially adjacent said base, which groove has been reduced axially from a greater to a lesser width with the said compression of the base, and
      a radially constricted, forwardly moved ring part at the rearward end of the sleeve integrally joined to the said rearward end of said column and having,
         an outwardly and rearwardly disposed camming shoulder forcibly engaged by the shoulder of the nut, and
         an inwardly and forwardly disposed cutting edge which has been forcibly plowed axially forwardly and radially inwardly into the tube by forcible camming engagement between said shoulders, and has made a strong, tight connection with the tube,
      said base having been foreshortened axially relatively greatly in relation to the motion of said cutting edge and the bulging of said column, whereby the latter has been preserved from excessive flexure during the making of said connection.

2. The combination of claim 1 wherein said annular chamber has a smooth interior cylindrical surface engaging said outwardly bulged column and resisting additional bulging thereof.

3. The combination of claim 1 in which said outwardly bulged column has its outside diameter increased from its original outside diameter not more than about five percent.

4. A tube coupling comprising in combination,
   a body to the rearward end of which a tube is to be coupled,
   a nut threadably engaging said body and having a forwardly facing camming shoulder and having an annular chamber forwardly of said shoulder, and
   a sleeve surrounding the tube between the said shoulder of the nut and the end of the body and adapted to be worked and reduced in axial length therebetween and into deformed and stressed engagement with the body, the nut and the tube, said sleeve having
      a substantially immovable abutment at is forward end for forcible engagement with the rearward end of said body,
      a middle column adapted to be worked and bulged outwardly in said chamber under columnar load and moved bodily forwardly relative to said abutment to reduce the length of said sleeve when said sleeve is worked between the nut and the body, said column having a wall of relatively great thickness and stiffness at is forward end and tapering to between about ½ to ⅔ that wall thickness at its rearward end,
      an integral annular column base of length and thickness about the same as the wall thickness of the rearward end of the column and disposed between and integrally joining said abutment and column, and said sleeve also having an annular groove radially adjacent said column base disposed between and separating a portion of the forward end of said column from a juxtaposed portion of the rear of said abutment, and a ring part at the rearward end of the sleeve integrally joined to the rearward end of said column adapted to be radially constricted and moved forwardly and having, an outwardly and rearwardly disposed camming shoulder for coaction with the shoulder of the nut, and an inwardly and forwardly disposed cutting edge that is adapted to be forcibly moved and plowed axially forwardly and radially inwardly into the tube by camming engagement between said shoulders to make a strong, tight connection with the tube, said base being yieldable in bending and axial compression and adapted to be worked and foreshortened axially while said groove is reduced axially from a greater to a lesser width during the forcible working of said sleeve and the said bulging and forward motion of said column, the reduction in axial length of said base being potentially great in relation to the potential bulging of said column part whereby to preserve said column against fracture while said connection is being made.

5. The combination of claim 4 in which the inside diameter of said chamber in the nut is not substantially greater than about 105% the outside diameter of said column adjacent thereto whereby to limit bulging of the column.

6. A coupling sleeve for a tube coupling comprising an annular thickened ring at the rearward end thereof with a tube cutting edge at its inner forward corner of slightly greater diameter than and engageable with the tube to be coupled, an annular abutment at the forward end of the sleeve having greater radial thickness than the ring and having an internal diameter smaller than said edge and a rearward surface engageable by the end of the tube to be coupled, an annular column in the middle of the sleeve integrally joining said ring at the rearward end of the column and having a weakened integral base in front of its forward end integrally joining said abutment, the wall of the column tapering from a thickened forward end adjacent and thicker than said base to a rearward end of lesser wall thickness adjacent said ring, the said forward end of the wall of said column being from about one-third to one-fourth as thick as said column is long and from about half again to twice as thick as the wall of the rearward end of the column, said sleeve having an external annular groove radially adjacent said base and of depth from about one-fourth to one-half the thickness of the base and reducing he base to less strength and less radial thickness than the forward end of the column adjacent thereto, the weakened, base and the groove coacting to induce axial foreshortening and flexing of the base and outward bending of the thickened forward end of the column about the base and outward bulging of the column when the column is subjected to columnar loading exerted between said ring and said abutment, said column being not substantially less resistant to bulging under columnar loading while gripping the tube to be coupled than said base is resistant to axial foreshortening under such loading.

7. A worked and joined tube coupling comprising in combination, a body to the rearward end of which a tube is coupled, a nut coacting with said body and having a forwardly facing camming shoulder and having an annular chamber forwardly of said camming shoulder, a coupling sleeve surrounding the tube and worked in said chamber between the nut and the body to reduced axial length and into stressed engagement with the body, the nut and the tube, wherein said sleeve comprises a substanttially unmoved abutment at its forward end in forcible engagement with the body, a worked hollow column in the middle of the sleeve formed with a wall thickness at its forward end greater than that at its rearward end and having axial strength and being stressed in axial compression and bulged outwardly to not substantially more than to about a five percent increase in outside diameter and moved bodily forwardly toward said abutment, an integral annular column base connecting the column and abutment, which base was, before being worked radially thinner and axially weaker than the column and abutment adjacent thereto and which base has been compressed and worked to increased radial thickness and to reduced axial length, shorter than its said thickness, and to increased strength between said abutment and column, an annular groove radially adjacent said base with juxtaposed faces on said abutment and said column respectively, which groove has been reduced axially with the compression of said base from a greater to a lesser width with said faces moved from spaced to close proximity less than about ¼ to ½ the original radial thickness of said base, and a radially constricted, forwardly moved ring part at the rearward end of the sleeve integrally joined to the rearward end of said column and having, an outwardly and rearwardly disposed camming shoulder forcibly engaged by the shoulder of the nut, and an inwardly and forwardly disposed cutting edge which has been moved and forcibly plowed axially forwardly and radially inwardly into the tube by forcible camming engagement between said shoulders, and has made a strong, tight connection with the tube, said base having been foreshortened axially relatively greatly in relation to the motion of said cutting edge and the bulging of said column part during the making of said connection.

8. The coupling of claim 7 wherein the rearward end of said body has a flat flush face, and the forward side of said abutment originally comprised a torus shaped surface and is in stressed flattened engagement with the said flush face of the body; the rearward side of said abutment being borne upon by said base and column, and being engaged and forcibly borne upon by the end of the tube.

References Cited in the file of this patent

UNITED STATES PATENTS

| 2,536,745 | Herold | Jan. 2, 1951 |
| 2,693,374 | Wurzburger | Nov. 2, 1954 |
| 2,823,935 | Wurzburger | Feb. 18, 1958 |

FOREIGN PATENTS

| 1,119,142 | France | Mar. 26, 1956 |
| 1,181,844 | France | Jan. 12, 1959 |